US011948723B2

(12) United States Patent
Hashimoto et al.

(10) Patent No.: US 11,948,723 B2
(45) Date of Patent: Apr. 2, 2024

(54) COIL COMPONENT

(71) Applicant: Murata Manufacturing Co., Ltd., Kyoto-fu (JP)

(72) Inventors: Ryota Hashimoto, Nagaokakyo (JP); Takashi Sukegawa, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 851 days.

(21) Appl. No.: 16/556,030

(22) Filed: Aug. 29, 2019

(65) Prior Publication Data

US 2020/0082970 A1 Mar. 12, 2020

(30) Foreign Application Priority Data

Sep. 11, 2018 (JP) ................................. 2018-169688

(51) Int. Cl.
*H01F 27/28* (2006.01)
*H01F 17/00* (2006.01)
*H01F 17/04* (2006.01)

(52) U.S. Cl.
CPC ......... *H01F 27/2823* (2013.01); *H01F 17/04* (2013.01); *H01F 2017/0093* (2013.01)

(58) Field of Classification Search
CPC ................. H01F 27/2823; H01F 17/04; H01F 2017/0093
See application file for complete search history.

(56) References Cited

U.S. PATENT DOCUMENTS 9,842,691 B2 12/2017 Yamakita
10,546,690 B2 1/2020 Yamakita
10,692,639 B2 6/2020 Jerez et al.
10,763,035 B2 9/2020 Horie et al.
10,910,143 B2 2/2021 Kobayashi et al.
2004/0263285 A1* 12/2004 Suzuki .................. H01F 41/082 333/185
2008/0224813 A1* 9/2008 Hirai ..................... H01F 17/045 336/216

(Continued)

FOREIGN PATENT DOCUMENTS

CN 106415754 A 2/2017
JP 2005-322820 A 11/2005

(Continued)

OTHER PUBLICATIONS

An Office Action; "Notice of Reasons for Refusal", mailed by the Japanese Patent Office dated Mar. 2, 2021, which corresponds to Japanese Patent Application No. 2018-169688 and is related to U.S. Appl. No. 16/556,030; with English language translation.

*Primary Examiner* — Bickey Dhakal
*Assistant Examiner* — Malcolm Barnes
(74) *Attorney, Agent, or Firm* — Studebaker & Brackett PC

(57) ABSTRACT

A winding core includes, for example, four planes, that is, a top surface, a bottom surface, a first side surface, and a second side surface around its central axis. A first wire and a second wire are wound around the winding core in the same direction and have a twisted section. In the twisted section in a plurality of turns at the top surface, bottom surface, first side surface, and second side surface, both the first wire and the second wire are in close contact with each of the ridges between the top surface, bottom surface, first side surface, and second side surface.

20 Claims, 6 Drawing Sheets

(56) References Cited

U.S. PATENT DOCUMENTS

| | | | | |
|---|---|---|---|---|
| 2013/0113585 | A1* | 5/2013 | Oki | H01F 27/29 335/297 |
| 2014/0070914 | A1* | 3/2014 | Oki | H01F 41/0206 336/233 |
| 2015/0042436 | A1* | 2/2015 | Arimitsu | H01F 27/292 336/192 |
| 2015/0061811 | A1* | 3/2015 | Takagi | H01F 27/292 336/192 |
| 2016/0379756 | A1* | 12/2016 | Yamakita | H01F 41/069 242/439.1 |
| 2017/0011844 | A1* | 1/2017 | Mikogami | H01F 41/127 |
| 2017/0025212 | A1* | 1/2017 | Jerez | H01F 41/07 |
| 2017/0069425 | A1* | 3/2017 | Yamakita | H01F 41/076 |
| 2017/0140858 | A1* | 5/2017 | Takagi | H01F 27/306 |
| 2018/0182534 | A1* | 6/2018 | Horie | H01F 27/292 |
| 2018/0277926 | A1* | 9/2018 | Park | H01Q 1/2283 |
| 2018/0322996 | A1* | 11/2018 | Kobayashi | H01F 27/292 |
| 2018/0374632 | A1* | 12/2018 | Kawahara | H01F 27/2823 |

FOREIGN PATENT DOCUMENTS

| | | | |
|---|---|---|---|
| JP | 2014-216525 | A | 11/2014 |
| JP | 2017-011132 | A | 1/2017 |
| JP | 2017-508298 | A | 3/2017 |
| JP | 2018-098250 | A | 6/2018 |
| JP | 2018-107306 | A | 7/2018 |
| WO | 2015/178165 | A1 | 11/2015 |

* cited by examiner

COIL COMPONENT

CROSS-REFERENCE TO RELATED APPLICATION

This application claims benefit of priority to Japanese Patent Application No. 2018-169688, filed Sep. 11, 2018, the entire content of which is incorporated herein by reference.

BACKGROUND

Technical Field

The present disclosure relates to coil components and in particular to a coil component having a structure in which two wires with a twisted section of being intertwisted are wound around a winding core.

Background Art

One example coil component that interests the present disclosure is a common-mode choke coil described in Japanese Unexamined Patent Application Publication No. 2014-216525. The common-mode choke coil described in Japanese Unexamined Patent Application Publication No. 2014-216525 has a structure in which first and second wires intertwisted are wound around a winding core. According to Japanese Unexamined Patent Application Publication No. 2014-216525, with the state where the first and second wires are intertwisted, a stray capacitance between the first and second wires can be reduced, and a decrease in the coefficient of coupling between the coil formed by the first wire and the coil formed by the second wire can be suppressed.

Also, Japanese Unexamined Patent Application Publication No. 2014-216525 describes the number of intertwisting of the first and second wires being two or more (see, for example, claim 3). That description, however, is very vague. Although the description indicates that the number of intertwisting is two or more, the length of the intertwisted portion or the unit turn for the number of intertwisting are unclear. Japanese Unexamined Patent Application Publication No. 2014-216525 does not provide more specific description on the state in which the first and second wires are intertwisted, that is, the twisted state, beyond the above-described content.

In the case where the wires are used in, for example, a small coil component, because an example diameter of the linear central conductor of each of them is not smaller than about 0.02 mm and not larger than about 0.080 mm (i.e., from about 0.02 mm to about 0.080 mm) and thus it is very thin, if the number of intertwisting, that is, the number of twists is increased, the possibility of a break in the wires is increased. Therefore, in practice, the number of twists is inevitably small, such as several times per turn.

FIG. 11 is an enlarged view of a twisted state of a first wire W1 and a second wire W2. In FIG. 11, for clearly distinguishing the first wire W1 and the second wire W2, the first wire W1 is hatched, and the second wire W2 is hollow. In FIG. 11, a twist direction of S twist is illustrated. The twist direction may also be of Z twist, which is opposite to the S twist, or of a mixture of Z twist and S twist. In FIG. 11, the first wire W1 and the second wire W2 are intertwisted in close contact with each other. The first wire W1 and the second wire W2 may be intertwisted partly with a gap therebetween.

In FIG. 11, a peripheral surface of a winding core is assumed to be present at the back of the drawing. As illustrated in FIG. 11, in the twisted state of the first wire W1 and the second wire W2 as seen from the outside of the peripheral surface of the winding core toward the central axis of the winding core, in the range of the length L, a twist of about 360 degrees is provided to the first wire W1 and the second wire W2. At that time, the number of twists of the first wire W1 and the second wire W2 is 1 in the range of the length L. That is, the number of twists needs to be defined per unit length.

The twist pitch is also called a twist pitch length and indicates the length from a specific relative location of the first wire W1 and the second wire W2 first back to the same next relative location in the twisted state of the first wire W1 and the second wire W2. Accordingly, the above-described length L is the twist pitch.

In FIG. 11, in the range of the length L, the second wire W2, which is illustrated in a hollow form, is above the first wire W1, which is hatched. Such a state is described below as an example. As seen from the outside of the peripheral surface of the winding core toward the central axis of the winding core, the point N at which the first wire W1 and the second wire W2 intersect is defined as a node, and the point A at which the first wire W1 and the second wire W2 are most remote is defined as an antinode.

In the case where the first wire and the second wire are wound around the winding core, example winding methods may include a method for guiding and winding previously twisted first and second wires around the peripheral surface of the winding core and a method for guiding and winding the first and second wires around the peripheral surface of the winding core while providing twists to them.

At that time, if special control is not performed between a twist providing operation and a winding operation, nodes and antinodes appearing in twisted section of the first wire and the second wire as seen from the outside of the peripheral surface of the winding core toward the central axis are likely to be randomly located for each turn, and their locations tend to be irregular. In particular, if a node in the twisted section is on a ridge of the winding core, because the wire on a side remote from the ridge is stretched toward the winding core, the twists are likely to lose their shapes, the locations of the nodes and antinodes in the twisted section of the first wire and the second wire tend to be irregular.

In the case where the locations of the nodes and antinodes in the twisted section are irregular, if the number of twists is relatively large, the numbers of the nodes and antinodes are large, and typically, the effects produced by one node and one antinode are relatively small. In contrast, in the above-described case, in which the number of twists is small, the effects produced by one node and one antinode are relatively large. In either case, the irregularity in the locations of the nodes and antinodes in the twisted section may raise issues described below.

First, the irregularity in the locations of the nodes and antinodes in the twisted section inhibits the stability of the wound state and twisted state of the first wire and the second wire. Specifically, the first wire and the second wire may get loose from the winding core or the lay may be imbalanced. Such instability of the wound state and twisted state of the first wire and the second wire encourages the irregularity in the locations of the nodes and antinodes in the twisted section.

The irregularity in the locations of the nodes and antinodes in the twisted section increases the possibility of disturbing the electrical balance between the first wire and the second wire. More specifically, a difference occurs between a stray capacitance formed in relation to the first wire and that in relation to the second wire. In that case, the inductance and capacitance affecting signals travelling through the first wire and that through the second wire are not equivalent, and for a common-mode choke coil, this may cause degradation in mode conversion characteristics.

SUMMARY

Accordingly, the present disclosure provides a coil component capable of improving the stability of a wound state and a twisted state of a first wire and a second wire.

According to preferred embodiments of the present disclosure, a coil component includes a winding core, a first wire, and a second wire. The winding core has a peripheral surface around its central axis. The peripheral surface includes at least one plane extending in a direction along the central axis. The plane includes a first end portion in a peripheral direction being a direction around the central axis and in which a first ridge extending in the direction along the central axis lies. The first wire and the second wire are spirally wound with a plurality of turns around the central axis of the winding core in the same direction and form a twisted section in which they are intertwisted in the plurality of turns.

In that coil component, both the first wire and the second wire are in close contact with the first ridge in the twisted section at the plane in a single turn.

According to the present disclosure, both the first wire and the second wire are in close contact with the first ridge in the twisted section at the plane in the peripheral surface of the winding core. In other words, as seen from the outside of the peripheral surface of the winding core toward the central axis of the winding core, an antinode of the first wire and the second wire in the twisted section is in close contact with the first ridge. Accordingly, even with a small number of twists, in comparison with a case where the node in the twisted section is located on the ridge, the stability of the wound state and twisted section of the first wire and the second wire can be improved, and consequently, the stability of the electrical characteristics of the coil component can be improved.

Because the antinode in the twisted section can be positioned by the ridge of the winding core, the irregularity in the locations of the nodes and antinodes in the twisted section can be reduced, and thus the electrical balance between the first wire and the second wire can be satisfactory. Accordingly, a difference occurring between a stray capacitance formed in relation to the first wire and that in relation to the second wire can be reduced, the inductance and capacitance affecting signals travelling through the first wire and that through the second wire can be equal or approximately equal, and for a common-mode choke coil, degradation in mode conversion characteristics can be reduced.

Other features, elements, characteristics and advantages of the present disclosure will become more apparent from the following detailed description of preferred embodiments of the present disclosure with reference to the attached drawings.

DETAILED DESCRIPTION

Figure 1:
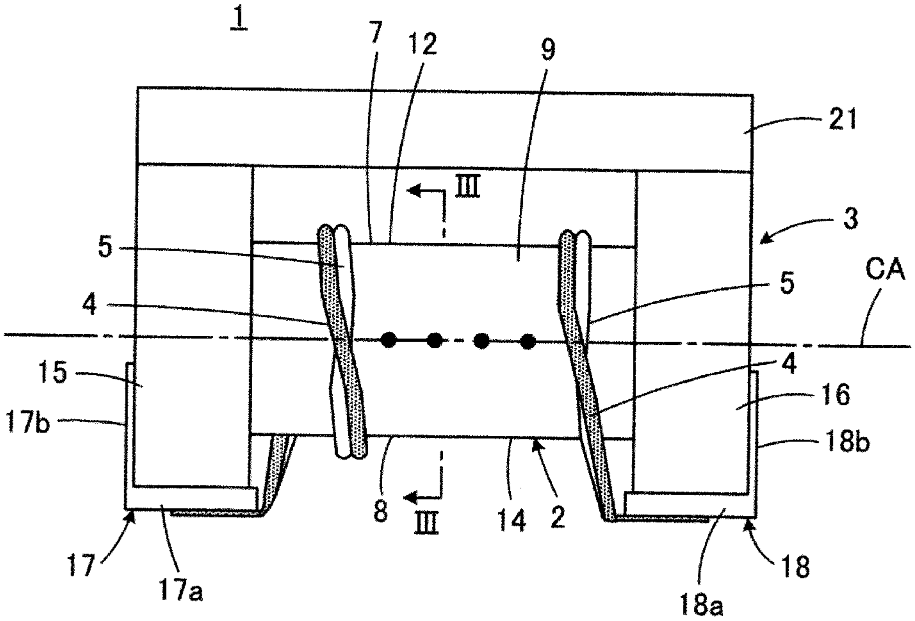
FIG. 1 is a front view of a coil component according to a first embodiment of the present disclosure.

A coil component 1 according to a first embodiment of the present disclosure is described with reference to FIGS. 1 to 5. One example of the coil component 1 illustrated may constitute a common-mode choke coil.

The coil component 1 includes a drum core 3 including a winding core 2. The coil component 1 further includes a first wire 4 and a second wire 5 arranged around the winding core 2. In FIGS. 1 to 4, for clearly distinguishing the first wire 4 and the second wire 5, the first wire 4 is hatched.

The drum core 3 may be made of a non-conductive material, more specifically, a non-magnetic substance, such as alumina, a magnetic substance, such as Ni—Zn-based ferrite, a resin, or the like. When the drum core 3 is made of a resin, examples of that resin may include a resin containing magnetic powder, such as metal powder or ferrite powder, a resin containing non-magnetic powder, such as silica powder, and a resin not containing a filler, such as powder.

Figure 4:
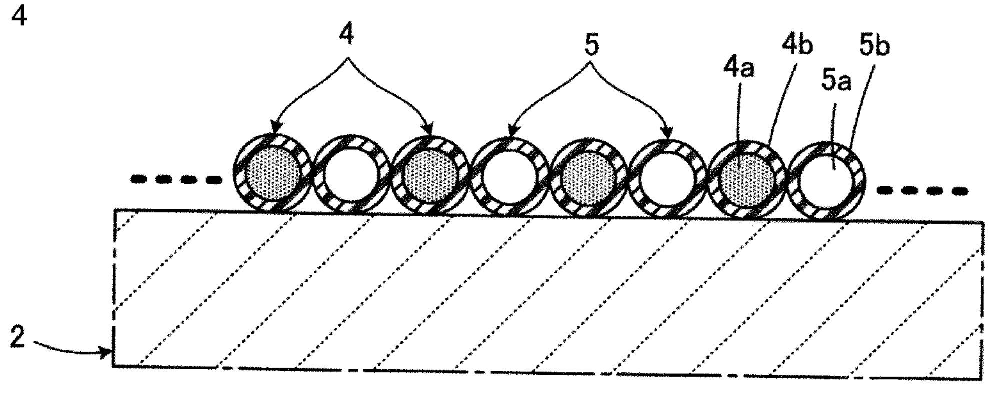
FIG. 4 schematically illustrates arrangement of the first wire and the second wire included in the coil component illustrated in FIG. 1 on a ridge of a winding core.

The wires 4 and 5 include linear central conductors 4*a* and 5*a*, respectively, and coatings 4*b* and 5*b*, respectively, as their cross sections are illustrated in FIG. 4. The central conductors 4*a* and 5*a* may be formed of copper lines whose diameters may be no smaller than about 0.02 mm and no larger than about 0.080 mm (i.e., from about 0.02 mm to about 0.080 mm). The coatings 4*b* and 5*b* cover the central conductors 4*a* and 5*a*, respectively, and may be made of an electrical insulating resin, such as polyurethane, imide-modified polyurethane, polyester-imide, or polyamide-imide.

The winding core 2 has a peripheral surface formed around its central axis CA. As is clear from FIG. 3, a cross-sectional shape of the winding core 2 along a plane substantially orthogonal to the central axis CA is substantially quadrangular. Accordingly, the peripheral surface of the winding core 2 includes four planes extending in the direction along the central axis CA, that is, a top surface 7 and a bottom surface 8, which are opposed to each other, and a first side surface 9 and a second side surface 10, which are adjacent to the top surface 7 and bottom surface 8 and are opposed to each other.

Example dimensions of portions of the winding core 2 measured in its peripheral direction may be approximately 0.6 mm for the first side surface 9 and second side surface 10, approximately 1.2 mm for the top surface 7 and bottom surface 8, and approximately 3.6 mm for its perimeter. An example longitudinal dimension of the winding core 2 measured in the direction in which the central axis CA extends may be approximately 2.0 mm.

Figure 3:
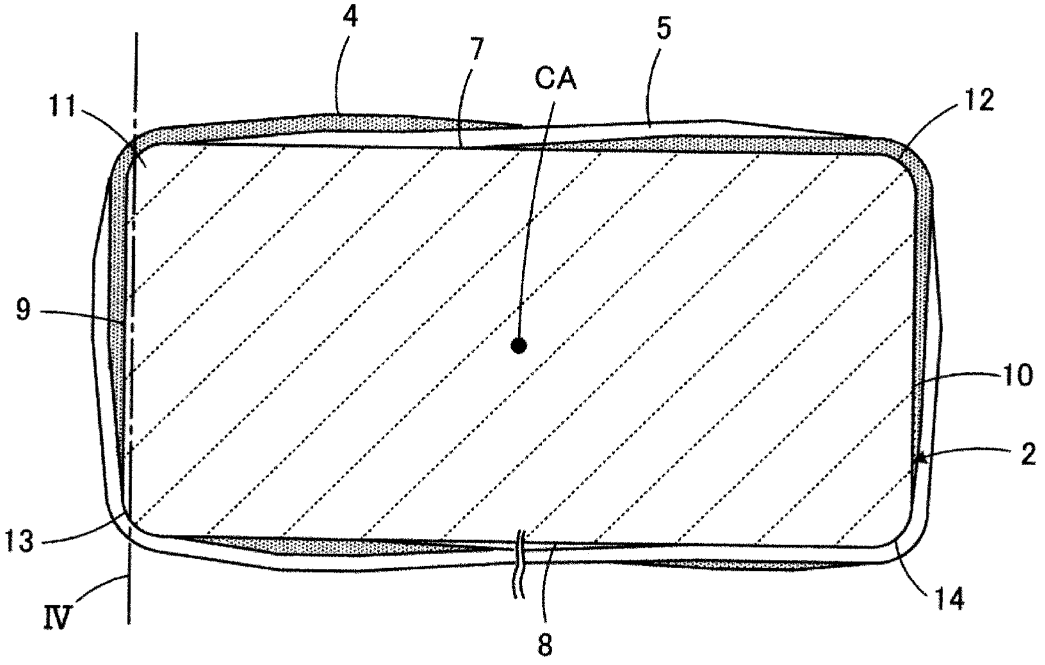
FIG. 3 illustrates a twisted state of a first wire and a second wire included in the coil component illustrated in FIG. 1 at a cross section taken along the line in FIG. 1.

A portion between the above-described top surface 7 and first side surface 9 is expressed as a first ridge 11, and a portion between the top surface 7 and second side surface 10 is expressed as a second ridge 12. A portion between the bottom surface 8 and first side surface 9 is expressed as a third ridge 13, and a portion between the bottom surface 8 and second side surface 10 is expressed as a fourth ridge 14. These ridges 11 to 14 may preferably be subjected to rounding, that is, their edges may preferably be rounded, as illustrated in FIG. 3.

Figure 2:
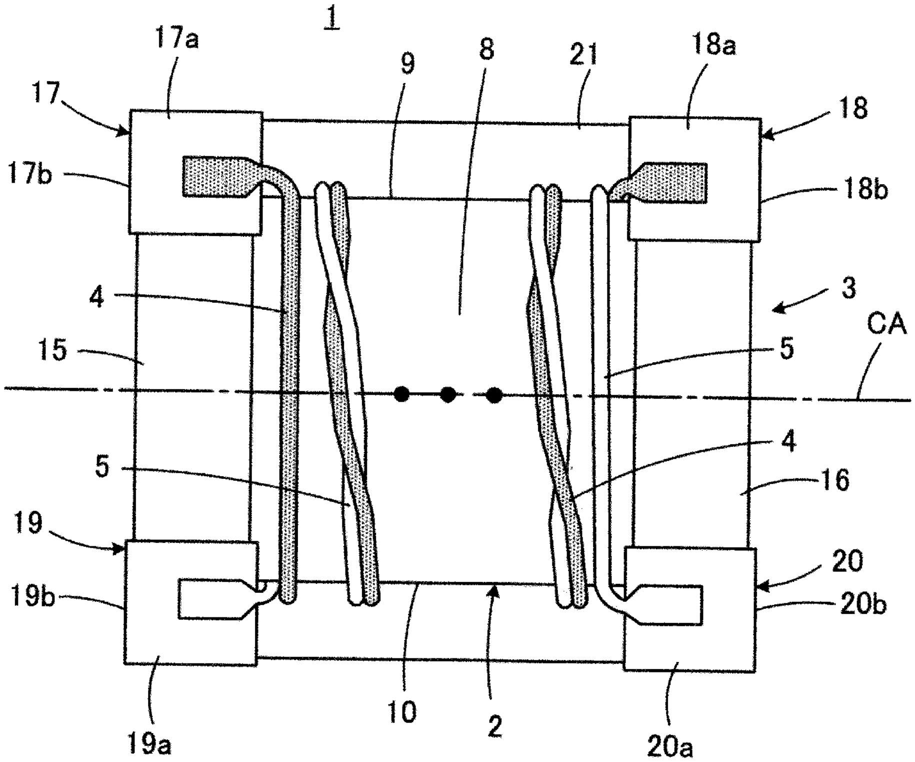
FIG. 2 is a bottom view of the coil component illustrated in FIG. 1.

As illustrated in FIGS. 1 and 2, the drum core 3 includes a first flange portion 15 and a second flange portion 16 continuous with a first end portion and a second end portion, which are opposite to each other in the central axis CA of the winding core 2, respectively. A first terminal electrode 17 and a third terminal electrode 19 are disposed on the first flange portion 15. A second terminal electrode 18 and a fourth terminal electrode 20 are disposed on the second flange portion 16.

As clearly illustrated in FIG. 1 for the first terminal electrode 17 and second terminal electrode 18, the terminal electrodes 17 to 20 include bottom electrode portions 17*a* to 20*a*, respectively, and end-surface electrode portions 17*b* to 20*b*, respectively. The bottom electrode portions 17*a* to 20*a* are disposed along surfaces of the flange portions 15 and 16 facing in the same direction as that of the bottom surface 8 of the winding core 2. The end-surface electrode portions 17*b* to 20*b* are disposed along external end surfaces of the flange portions 15 and 16. The bottom electrode portions 17*a* to 20*a* may be formed by, for example, baking conductive paste including silver. The end-surface electrode portions 17*b* to 20*b* may be formed by, for example, sputtering of NiCr after the formation of the bottom electrode portions 17*a* to 20*a* and then sputtering of NiCu. After the formation of the bottom electrode portions 17*a* to 20*a* and end-surface electrode portions 17*b* to 20*b* described above, for example, copper plating, nickel plating, and tin plating continuously covering the bottom electrode portions 17*a* to 20*a* and end-surface electrode portions 17*b* to 20*b* may be applied in sequence.

The terminal electrodes 17 to 20 may also be formed by joining metal terminals obtained by processing a metal plate made of a metal material, such as phosphor bronze, oxygen-free copper, or tough pitch copper, to the flange portions 15 and 16 in the drum core 3.

The end portions of the first wire 4 are connected to the first terminal electrode 17 and second terminal electrode 18, respectively. The end portions of the second wire 5 are connected to the third terminal electrode 19 and fourth terminal electrode 20, respectively. To these connections, for example, thermocompression bonding or laser welding may be applied.

The coil component 1 may further include a plate-like core 21. The plate-like core 21 is bonded to the drum core 3. As in the case of the drum core 3, the plate-like core 21 may be made of a non-magnetic substance, such as alumina, a magnetic substance, such as Ni—Zn-based ferrite, a resin, or the like. When the plate-like core 21 is made of a resin, examples of that resin may include a resin containing magnetic powder, such as metal powder or ferrite powder, a resin containing non-magnetic powder, such as silica powder, and a resin not containing a filler, such as powder. When the drum core 3 and plate-like core 21 are made of a magnetic substance, the plate-like core 21 is disposed so as to span the gap between the first flange portion 15 and second flange portion 16, thus enabling the drum core 3 to work in coordination with the plate-like core 21 and forming a closed magnetic circuit. When the direction along the central axis CA is defined as the longitudinal direction, the direction being substantially perpendicular to the central axis CA and in which the plate-like core 21 and the flange portions 15 and 16 are in contact with each other is defined as the thickness direction, and the direction substantially orthogonal to both of the longitudinal direction and the thickness direction is defined as the width direction, example dimensions of the plate-like core 21 may be approximately 3.2 mm in the longitudinal direction, approximately 2.5 mm in the width direction, and approximately 0.7 mm in the thickness direction.

A large proportion of each of the first wire 4 and second wire 5 is in a twisted state in which they are intertwisted, except for their end portions connected to the above-described terminal electrodes 17 to 20 and their adjacent areas. In winding the first wire 4 and second wire 5, which have such a twisted section, around the winding core 2, the first wire 4 and second wire 5 are spirally wound with a plurality of turns around the central axis CA of the winding core 2 in the same direction while a twist is provided to the first wire 4 and second wire 5 or after the first wire 4 and second wire 5 are brought into the twisted state. In that way, the first wire 4 and second wire 5 form the twisted section in the plurality of turns. As previously described, because the first wire 4 and second wire 5 are covered with the insulating coatings, they are not electrically connected to each other.

FIG. 4 schematically illustrates arrangement of the first wire 4 and second wire 5 on the ridge 11. FIG. 4 is a drawing formed on the basis of images sequentially captured by X-ray computed tomography (CT) at cut planes substantially parallel with the first side surface 9 of the winding core 2 while being displaced by about 1 μm in the direction from the first side surface 9 toward the second side surface 10. FIG. 4 schematically illustrates arrangement of the first wire 4 and second wire 5 observed at a cut plane IV, which is so near the first side surface 9 that the portion of the ridge 11 is captured into an X-ray CT image.

As illustrated in FIG. 4, neighboring ones of the first wire 4 and second wire 5 are in contact with each other, whereas the central conductors 4*a* and 5*a* of the neighboring first wire 4 and second wire 5 are not in contact with each other because of the presence of the coatings 4*b* and 5*b*, which are made of an electrical insulating resin.

As illustrated in FIGS. 3 and 4, the first wire 4 and second wire 5 on each of the first ridge 11 between the top surface 7 and first side surface 9, the second ridge 12 between the second side surface 10 and top surface 7, the third ridge 13 between the first side surface 9 and bottom surface 8, and the fourth ridge 14 between the bottom surface 8 and second side surface 10 of the winding core 2 are arranged side by side in the direction in which the ridges 11 to 14 extend. Each of the first wire 4 and second wire 5 in the same turn, more accurately, the electrical insulating coating of each of the first wire 4 and second wire 5 in the same turn is in close contact with each of the first ridge 11, second ridge 12, third ridge 13, and fourth ridge 14. Being in close contact indicates that the first wire or second wire is in contact with the ridge. That state can be seen in FIG. 5, which is described below.

In that state, as illustrated in FIG. 4, the distance between the first wire 4 and second wire 5 may preferably be constant. In that case, the electrical balance between the first wire 4 and second wire 5 can be satisfactory. When the outer surfaces of the first wire 4 and second wire 5, that is, the electrical insulating coatings of the first wire 4 and second wire 5 are in close contact with each other, the central conductors of the first wire 4 and second wire 5 can be reliably spaced apart from each other because of the electrical insulating resin forming the insulating coatings, and thus, the electrical balance can be satisfactory.

Figure 5:
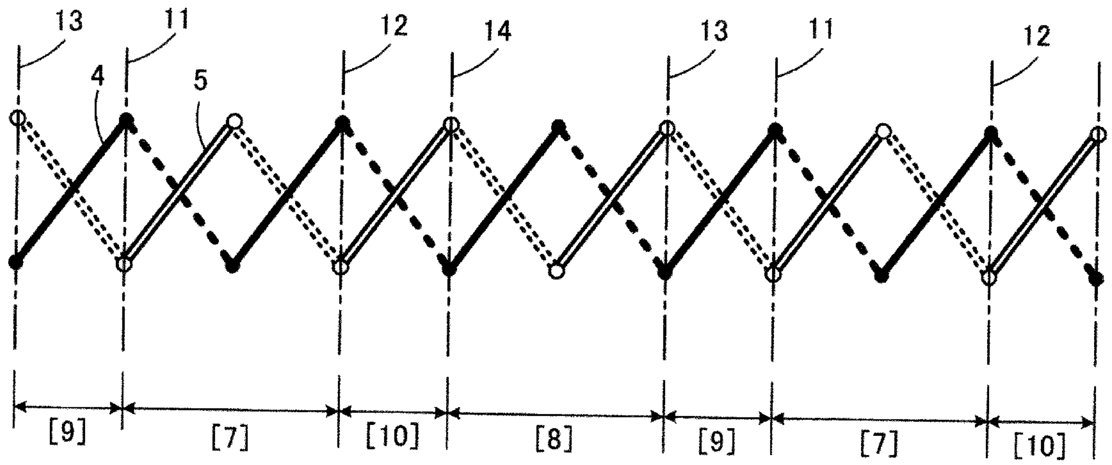
FIG. 5 schematically illustrates the twisted state of the first wire and the second wire in the coil component illustrated in FIG. 1 in a way in which a peripheral surface of the winding core is unfolded.

FIG. 5 schematically illustrates the twisted state of the first wire 4 and second wire 5 in a way in which the peripheral surface of the winding core 2 is unfolded in the order of the first side surface 9, top surface 7, second side surface 10, and bottom surface 8. In FIG. 5, the first wire 4 is indicated by the thick line, and the second wire 5 is indicated by the double lines. Of the first wire 4 and second wire 5, an upper one at an intersection is indicated by the solid lines, and a lower one at the intersection is indicated by the broken lines.

Figure 11:
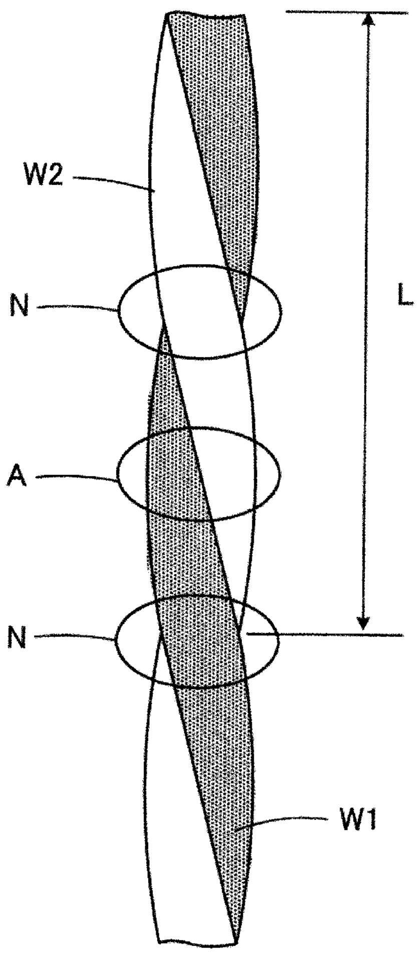
FIG. 11 is an illustration for describing a twist pitch, the number of twists, and nodes and antinodes and is an enlarged view of a twisted state of a first wire and a second wire.

As previously described with reference to FIG. 11, when the number of twists in the state in which the first wire 4 and second wire 5 are twisted about 360 degrees is defined as 1 and its length is defined as the twist pitch, the number of twists on the first side surface 9 in FIG. 5 is 0.5 and the twist pitch is 0.5 because the first wire 4 and second wire 5 are twisted about 180 degrees. As seen from the outside of the peripheral surface of the winding core 2 toward the central axis CA of the winding core 2, for antinodes of the first wire 4 and second wire 5 in the twisted section at the first side surface 9, one antinode is located on each of the ridges 13 and 11, which are located in the opposite end portions of the first side surface 9 in the peripheral direction, and the first wire 4 and second wire 5 are arranged side by side in the direction in which the ridges 13 and 11 extend and are in close contact with each of the ridges 13 and 11. For nodes of the first wire 4 and second wire 5 in the twisted section, one node appears near the middle point of the first side surface 9 in the peripheral direction.

Next, the number of twists of the first wire 4 and second wire 5 at the top surface 7 is 1. For antinodes of the first wire 4 and second wire 5 in the twisted section, one antinode is located on each of the ridges 11 and 12, which are located in the opposite end portions of the top surface 7 in the peripheral direction, and the first wire 4 and second wire 5 are arranged side by side in the direction in which the ridges 11 and 12 extend and are in close contact with each of the ridges 11 and 12. Another antinode of the first wire 4 and second wire 5 in the twisted section appears near the middle point of the top surface 7 in the peripheral direction. For nodes of the first wire 4 and second wire 5 in the twisted section, two nodes appear; one node appears in the location of approximately ¼ of the dimension of the top surface 7 in the peripheral direction, and the other node appears in the location of approximately ¾ thereof.

The first wire 4 and second wire 5 are not restricted to the above-described form. Depending on the number of twists and the lengths of the planes of the winding core in the peripheral direction per turn, the number of twists at any plane may be a value other than multiples of 0.5.

Next, the number of twists of the first wire 4 and second wire 5 at the second side surface 10 is 0.5. For antinodes of the first wire 4 and second wire 5 in the twisted section, one antinode is located on each of the ridges 12 and 14, which are located in the opposite end portions of the second side surface 10 in the peripheral direction, and the first wire 4 and second wire 5 are arranged side by side in the direction in which the ridges 12 and 14 extend and are in close contact with each of the ridges 12 and 14. For nodes of the first wire 4 and second wire 5 in the twisted section, one node appears near the middle point of the second side surface 10 in the peripheral direction.

Next, the number of twists of the first wire 4 and second wire 5 at the bottom surface 8 is 1. For antinodes of the first wire 4 and second wire 5 in the twisted section, one antinode is located on each of the ridges 14 and 13, which are located in the opposite end portions of the bottom surface 8 in the peripheral direction, and the first wire 4 and second wire 5 are arranged side by side in the direction in which the ridges 14 and 13 extend and are in close contact with each of the ridges 14 and 13. Another antinode of the first wire 4 and second wire 5 in the twisted section appears near the middle point of the bottom surface 8 in the peripheral direction. For nodes of the first wire 4 and second wire 5 in the twisted section, two nodes appear; one node appears in the location of approximately ¼ of the dimension of the bottom surface 8 in the peripheral direction, and the other node appears in the location of approximately ¾ thereof.

The same twisting is repeated a predetermined number of times thereafter.

As described above, when the first wire 4 and second wire 5 are both in close contact with each of the first ridge 11, second ridge 12, third ridge 13, and fourth ridge 14, the wound state and twisted state of the first wire 4 and second wire 5 on the winding core 2 is stabilized, and this contributes to stabilization of the electrical characteristics of the coil component 1. By repeating this configuration a predetermined number of times, the coil component 1 is further stabilized electrically.

Because the antinodes in the twisted section are positioned by the ridges 11 to 14 of the winding core 2, the irregularity in the locations of the nodes and antinodes in the twisted section can be reduced, and thus the electrical balance between the first wire 4 and second wire 5 can be satisfactory. Accordingly, the difference between the stray capacitance formed in relation to the first wire 4 and that in relation to the second wire 5 can be reduced, and the inductance and capacitance affecting signals travelling through the first wire 4 and that through the second wire 5 can be equivalent or broadly equivalent, and for a common-mode choke coil, degradation in its mode conversion characteristics can be reduced.

The dimensions of the top surface 7, bottom surface 8, first side surface 9, and second side surface 10 constituting the peripheral surface of the winding core 2 in the peripheral direction are twist pitch×0.5, twist pitch×1, twist pitch×0.5, and twist pitch×1, respectively, and they are multiples of "twist pitch×0.5." The total dimension of the winding core 2 in the peripheral direction is also a multiple of "twist pitch×0.5."

FIGS. 1 to 4 reveal that the dimension of each of the top surface 7 and bottom surface 8 measured in the peripheral direction of the winding core 2 is twice the dimension of each of the first side surface 9 and second side surface 10 measured in the peripheral direction of the winding core 2. That is, the dimension of each of the top surface 7 and bottom surface 8 measured in the peripheral direction of the winding core 2 is an integral multiple of the dimension of each of the first side surface 9 and second side surface 10 measured in the peripheral direction of the winding core 2. Here, of the four dimensions of the top surface 7, bottom surface 8, first side surface 9, and second side surface 10 measured in the peripheral direction of the winding core 2, the dimension of each of the first side surface 9 and second side surface 10 is the shortest. In that case, the dimension of each of the top surface 7, bottom surface 8, first side surface 9, and second side surface 10 measured in the peripheral direction of the winding core 2 is an integral multiple of the dimension of each of the first side surface 9 and second side surface 10, which is the shortest dimension.

In that configuration, because the state where the first wire 4 and second wire 5 are in close contact with the ridges 11 to 14 is obtainable with the fixed twist pitch, the coil component 1 can be produced on a larger scale.

The twisting direction of the first wire 4 and second wire 5 in the twisted section may be opposite to the illustrated direction, or alternatively, two twisting directions may coexist, for example, the twisting direction may be inverted at the location where the first wire 4 and second wire 5 pass through the ridges 11, 12, 13, and 14. The state where the first wire 4 and second wire 5 are intertwisted is not limited to the state illustrated in FIGS. 1 to 3, where they are in close contact with each other. For example, the first wire 4 and second wire 5 may be intertwisted in a state where a gap is present between them in part. When the first wire 4 and second wire 5 are in close contact with each other, because the central conductors of the wires 4 and 5 are covered with the electrical insulating resin, as previously described, the central conductors are spaced away from each other.

In the first embodiment described above, for example, as for the first ridge 11, which is one end portion of the top surface 7 of the winding core 2, because the first wire 4 and second wire 5 are in contact with the first ridge 11 at the same time in a plurality of turns of the first wire 4 and second wire 5, the number of close contacts of the first wire 4 with the first ridge 11 and the number of close contacts of the second wire 5 with the first ridge 11 are approximately equal.

Here, because the first wire 4 and second wire 5 are separated in some areas, for example, in a winding beginning portion and a winding ending portion of the first wire 4 and second wire 5, the number of close contacts of the first wire 4 with the ridge 11 and the number of close contacts of the second wire 5 with the ridge 11 described above may not be necessarily equal in all occasions. Accordingly, those numbers may have a difference corresponding to, for example, about two turns.

The number of close contacts of the first wire 4 with the ridge 11 and the number of close contacts of the second wire 5 with the ridge 11 between the winding beginning portion and the winding ending portion of the first wire 4 and second wire 5 may not be necessarily equal in all occasions.

In the first embodiment, in the twisted section in the plurality of turns of the first wire 4 and second wire 5, both of the first wire 4 and second wire 5 are in close contact with two ridges having line symmetry with each other and being opposed to each other, for example, the ridges 11 and 12 among the ridges 11, 12, 13, and 14, which are located between neighboring surfaces of the top surface 7, bottom surface 8, first side surface 9, and second side surface 10 of the winding core 2. Similarly, both of the first wire 4 and second wire 5 are also in close contact with the two ridges 12 and 14, with the two ridges 14 and 13, and with the two ridges 13 and 11, each of the combinations having line symmetry with each other and being opposed to each other.

Accordingly, the number of times the first wire 4 passes through the ridge 11 in close contact therewith and the number of times the second wire 5 passes through the ridge 11 in close contact therewith are equal. Similarly, the number of times the first wire 4 passes through the ridge 12 in close contact therewith and the number of times the second wire 5 passes through the ridge 12 in close contact therewith are equal. Similarly, the number of times the first wire 4 passes through the ridge 14 in close contact therewith and the number of times the second wire 5 passes through the ridge 14 in close contact therewith are equal. Similarly, the number of times the first wire 4 passes through the ridge 13 in close contact therewith and the number of times the second wire 5 passes through the ridge 13 in close contact therewith are equal.

The number of times the first wire 4 passes through the ridge 11 in close contact therewith, and the number of times the first wire 4 passes through the ridge 12 in close contact therewith are equal, the two ridges 11 and 12 having line symmetry with each other and being opposed to each other. The number of times the second wire 5 passes through the ridge 11, which is one of the two ridges 11 and 12, in close contact therewith and the number of times the second wire 5 passes through the ridge 12, which is the other of the two ridges 11 and 12, in close contact therewith are equal. Similarly, the number of times the first wire 4 passes through the ridge 12 in close contact therewith, and the number of times the first wire 4 passes through the ridge 14 in close contact therewith are equal, the two ridges 12 and 14 having line symmetry with each other and being opposed to each other. The number of times the second wire 5 passes through the ridge 12, which is one of the two ridges 12 and 14, in close contact therewith and the number of times the second wire 5 passes through the ridge 14, which is the other of the two ridges 12 and 14, in close contact therewith are equal. Similarly, the number of times the first wire 4 passes through the ridge 14 in close contact therewith, and the number of times the first wire 4 passes through the ridge 13 in close contact therewith are equal, the two ridges 14 and 13 having line symmetry with each other and being opposed to each other. The number of times the second wire 5 passes through the ridge 14, which is one of the two ridges 14 and 13, in close contact therewith and the number of times the second wire 5 passes through the ridge 13, which is the other of the two ridges 14 and 13, in close contact therewith are equal. Similarly, the number of times the first wire 4 passes through the ridge 13 in close contact therewith, and the number of times the first wire 4 passes through the ridge 11 in close contact therewith are equal, the two ridges 13 and 11 having line symmetry with each other and being opposed to each other. The number of times the second wire 5 passes through the ridge 13, which is one of the two ridges 13 and 11, in close contact therewith and the number of times the second wire 5 passes through the ridge 11, which is the other of the two ridges 13 and 11, in close contact therewith are equal.

In some of the above-described configurations, however, the number of times the first wire 4 passes and the number of times the second wire 5 passes described as being equal may not be necessarily equal. For example, they may have a difference corresponding to about two turns.

In the first embodiment, for example, as for the first ridge 11, which is in one end portion of the top surface 7 of the winding core 2, and the second ridge 12, which is in the other end portion thereof, both the first wire 4 and second wire 5 are in close contact with both the first ridge 11 and second ridge 12 in the twisted section at the top surface 7. The twisted section in such a state is present in at least one turn.

In the first embodiment, in a plurality of neighboring turns, both the first wire 4 and second wire 5 are in close contact with each of the first ridge 11, second ridge 12, third ridge 13, and fourth ridge 14. As in that configuration, the stability of the wound state and twisted state increases with an increase in the number of ridges with which both the first wire 4 and second wire 5 are in close contact. In the plurality of neighboring turns, however, the first wire 4 and second wire 5 may be in close contact with only one of the first ridge 11, second ridge 12, third ridge 13, and fourth ridge 14.

In the above embodiment, in the plurality of neighboring turns, the first wire 4 and second wire 5 may be in close contact with only one of the first ridge 11, second ridge 12, third ridge 13, and fourth ridge 14. The first wire 4 and second wire 5, however, may be in close contact with only one of the first ridge 11, second ridge 12, third ridge 13, and fourth ridge 14 in at least one turn, for example, simply only one turn.

The number of turns in which both the first wire 4 and second wire 5 are in close contact with at least one of the first ridge 11, second ridge 12, third ridge 13, and fourth ridge 14 may preferably be large. For example, when the first wire 4 and second wire 5 wound are in close contact with the ridge in four or more turns among five turns, the mode conversion characteristics in the common-mode choke coil can be stabilized. The first wire 4 and second wire 5 wound may preferably be in close contact with the ridge in five or more turns among six turns.

Figure 6:
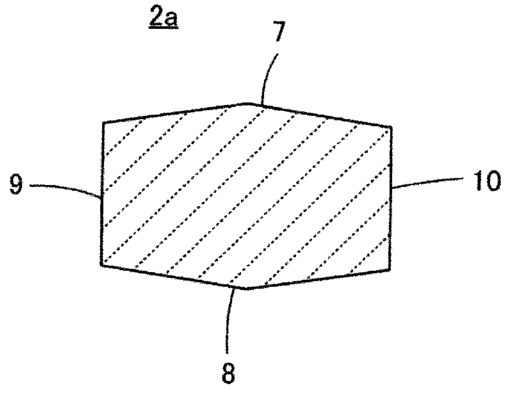
FIG. 6 is a cross-sectional view of a winding core included in a coil component according to a second embodiment of the present disclosure.
Figure 7:
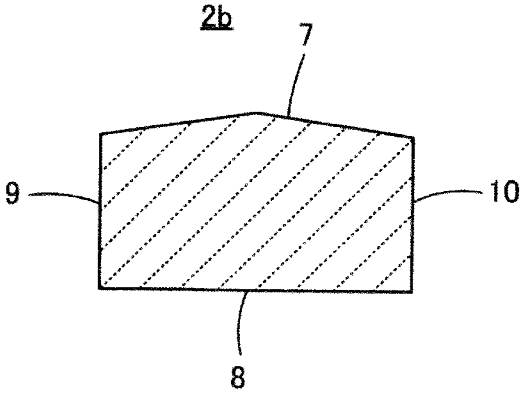
FIG. 7 is a cross-sectional view of a winding core included in a coil component according to a third embodiment of the present disclosure.

In the first embodiment described above, the peripheral surface of the winding core 2 includes the four planes arranged adjacently in the peripheral direction, that is, the top surface 7, bottom surface 8, first side surface 9, and second side surface 10, and a cross-sectional shape of the winding core 2 along a plane substantially orthogonal to the central axis CA of the winding core 2 is a substantially quadrangle with straight-line sides. As described below, variations illustrated in FIGS. 6 to 8 may also be adopted. In FIGS. 6 and 7, elements corresponding to the elements illustrated in FIG. 3 are indicated by the same reference numerals, and redundant description is omitted.

In a winding core 2*a* illustrated in FIG. 6, a cross-sectional shape along a plane substantially orthogonal to its central axis CA is substantially hexagonal. That substantially hexagonal shape is defined by six sides with the same length. Differences from the winding core 2 illustrated in FIG. 3 are described below with the reference numerals in the winding core 2 illustrated in FIG. 3. Each of a cross-sectional shape of the top surface 7 and a cross-sectional shape of the bottom surface 8 is a bent shape extending outward.

In that embodiment, in comparison with the winding core 2 illustrated in FIG. 3, which has a substantially quadrangular cross-sectional shape, the degree of the flexibility in changing the ratio between the width and the height of the cross-sectional shape of the winding core 2*a* can be higher. For example, in comparison with the winding core 2 illustrated in FIG. 3, the cross-sectional area can be increased and the inductance can be improved, without having to noticeably change the dimension in the height direction. Each of the interior angles formed by the ridges of the peripheral surface of the winding core 2, which is illustrated in FIG. 3 and has a substantially quadrangular cross section, is approximately 90 degrees. In contrast, the interior angles formed between the ridges of the peripheral surface of the winding core 2*a*, which is illustrated in FIG. 6 and has a substantially hexagonal cross-sectional shape, are all obtuse angles, which exceed 90 degrees. Accordingly, the sharpness of the corners formed by the ridges of the peripheral surface of the winding core 2*a* can be reduced, in comparison with that in the winding core 2, which is illustrated in FIG. 3 and has a substantially quadrangular cross-sectional shape, and the damage to the wires can be reduced.

In a winding core 2*b* illustrated in FIG. 7, a cross-sectional shape corresponding to the cross-sectional shape of the winding core 2 illustrated in FIG. 3 is substantially pentagonal. Differences from the winding core 2 illustrated in FIG. 3 are described below with the reference numerals in the winding core 2 illustrated in FIG. 3. A cross-sectional shape of the top surface 7 is a bent shape extending outward.

In that embodiment, for the dimensions of the winding core 2*b* measured in the peripheral direction, the dimension of the bottom surface 8 is not an integral multiple of any of the dimensions of the top surface 7, first side surface 9, and second side surface 10. In at least one turn, however, an antinode in the twisted section can be located on one of the ridges, and thus, the stability of the wound state and twisted state of the first wire and second wire can be improved. To obtain a state where the first wire and second wire are arranged side by side on all of the ridges, it is necessary to change the twist pitch for the winding on the bottom surface 8 and the winding on each of the top surface 7, first side surface 9, and second side surface 10. That is, actualization of the state where the first wire and second wire are arranged side by side on the ridges is related to the positional relationship between the twisted state and the ridges, and thus, the twist pitch may not be necessarily constant for the entire perimeter of the winding core.

To avoid such complications, the cross-sectional shape of the winding core 2*b* may be substantially regular pentagonal.

Figure 8:
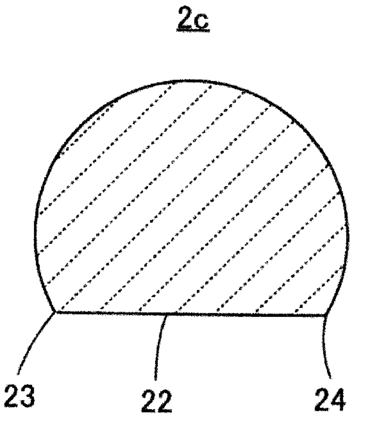
FIG. 8 is a cross-sectional view of a winding core included in a coil component according to a fourth embodiment of the present disclosure.

In a winding core 2*c* illustrated in FIG. 8, the peripheral surface formed around its central axis has a single plane 22 extending in the direction along the central axis. The plane 22 includes a first end portion and a second end portion opposite to the first end portion in the peripheral direction, a first ridge 23 extending in the direction along the central axis lies in the first end portion, and a second ridge 24 extending along the central axis lies in the second end portion.

A twisted section of the first wire and second wire (not illustrated) is wound with a plurality of turns around the above-described winding core 2*c*. At that time, in the twisted section in the plurality of turns at the plane 22, both the first wire and second wire may be in close contact with only one of the first ridge 23 or second ridge 24. In that way, the stability of the wound state and twisted state of the first wire and second wire can be improved. To further stabilize the wound state and twisted state, the first wire and second wire may preferably be located in a state where they are arranged side by side on both the first ridge 23 and second ridge 24 in a direction in which each of the ridges 23 and 24 extends.

Figure 9:
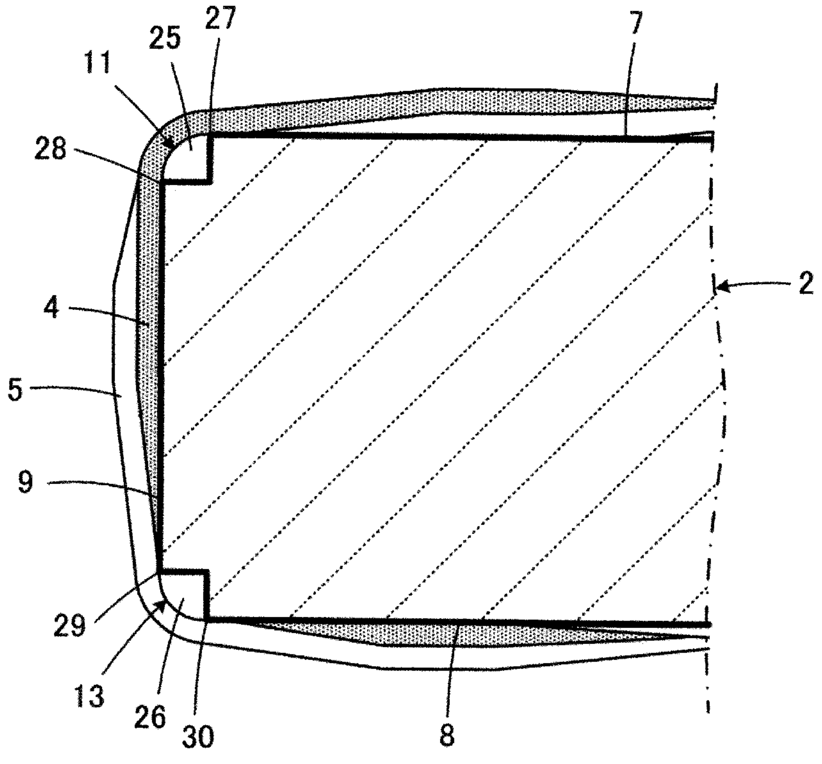
FIG. 9 is an illustration for describing a fifth embodiment of the present disclosure and corresponds to a drawing in which a left side of the cross-sectional view illustrated in FIG. 3 is enlarged.
Figure 10:
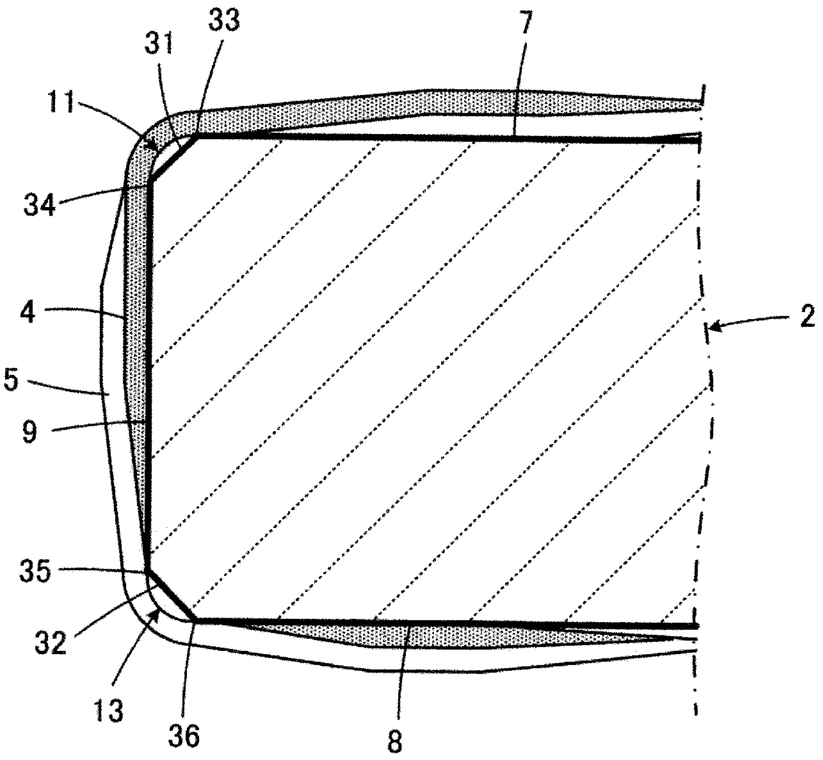
FIG. 10 is an illustration for describing a sixth embodiment of the present disclosure and corresponds to a drawing in which the left side of the cross-sectional view illustrated in FIG. 3 is enlarged.

FIGS. 9 and 10 are illustrations for describing fifth and sixth embodiments of the present disclosure, respectively, and correspond to drawings in which the left side of the cross-sectional view illustrated in FIG. 3 is enlarged. In FIGS. 9 and 10, elements corresponding to the elements illustrated in FIG. 3 are indicated by the same reference numerals, and redundant description is omitted.

Both the fifth and sixth embodiments are characterized in the shape of cut edges of the ridges of the winding core 2. In FIGS. 9 and 10, only the first ridge 11 and third ridge 13 are illustrated, and the second ridge 12 and fourth ridge 14 are not illustrated. The form of the second ridge 12 and fourth ridge 14 is symmetrical with the form of the first ridge 11 and third ridge 13. The first ridge 11 and third ridge 13 are discussed below, and the description about the second ridge 12 and fourth ridge 14 is omitted.

Referring to FIG. 9, the ridges 11 and 13 of the winding core 2 are subjected to cutting of the edges to form escapes 25 and 26, respectively, in their corners. Thus, two projecting portions 27 and 28 are formed in the area of the ridge 11, and two projecting portions 29 and 30 are formed in the area of the ridge 13. When the wires 4 and 5 are wound around the winding core 2, the wires 4 and 5 are definitely in close contact with at least one of the two projecting portions 27 and 28 in the area of the ridge 11 and at least one of two projecting portions 29 and 30 in the area of the ridge 13. Typically, when the wires 4 and 5 are wound anticlockwise, the wires 4 and 5 tend to be definitely in close contact with the projecting portion 27 in the area of the ridge 11 and the projecting portion 29 in the area of the ridge 13, whereas when the wires 4 and 5 are wound clockwise, the wires 4 and 5 tend to be definitely in close contact with the projecting portion 28 in the area of the ridge 11 and the projecting portion 30 in the area of the ridge 13.

As described above, even when the escapes 25 and 26 are in the ridges 11 and 13, respectively, the wires 4 and 5 are definitely in close contact with some place of the areas of the ridges 11 and 13.

Next, referring to FIG. 10, the ridges 11 and 13 of the winding core 2 are subjected to cutting of the edges to form chamfered surfaces 31 and 32, respectively. Thus, two projecting portions 33 and 34 are formed in the area of the ridge 11, and two projecting portions 35 and 36 are formed in the area of the ridge 13. When the wires 4 and 5 are wound around the winding core 2, the wires 4 and 5 are definitely in close contact with at least one of the two projecting portions 33 and 34 in the area of the ridge 11 and at least one of two projecting portions 35 and 36 in the area of the ridge 13. Typically, when the wires 4 and 5 are wound anticlockwise, the wires 4 and 5 tend to be definitely in close contact with the projecting portion 33 in the area of the ridge 11 and the projecting portion 35 in the area of the ridge 13, whereas when the wires 4 and 5 are wound clockwise, the wires 4 and 5 tend to be definitely in close contact with the projecting portion 34 in the area of the ridge 11 and the projecting portion 36 in the area of the ridge 13.

As described above, in the embodiment illustrated in FIG. 10, even when the chamfered surfaces 31 and 32 are in the ridges 11 and 13, respectively, the wires 4 and 5 are definitely in close contact with some place of the areas of the ridges 11 and 13, as in the case of the embodiment illustrated in FIG. 9.

The present disclosure is described above in relation to several embodiments illustrated in the drawings. Other variations can be made within the scope of the present disclosure.

For example, the first wire 4 and second wire 5 in the twisted state illustrated in FIGS. 1 to 5, which are wound on the winding core 2 in a single layer, may also be wound in two or more layers. If they are wound in two or more layers, at least the first layer in contact with the winding core 2 may be required to satisfy the above-described conditions.

The above-described embodiments relate to coil components forming common-mode choke coils. The present disclosure is also applicable to other coil components, including coil components forming transformers and coil components forming baluns. In the above-described embodiments, two wires, the first wire and the second wire, are intertwisted. The number of wires, however, may also be three or more.

The above-described are illustrative, and the configurations can be replaced or combined in part between different embodiments.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A coil component comprising:

a winding core having a peripheral surface around a central axis of the winding core, the peripheral surface including at least one plane extending in a direction along the central axis, the plane including a first end portion in a peripheral direction being a direction around the central axis and in which a first ridge extending in the direction along the central axis lies; and a first wire and a second wire spirally wound with a plurality of turns around the central axis of the winding core in a same direction and forming a twisted section in which they are intertwisted in the plurality of turns, such that both the first wire and the second wire are in close contact with the first ridge in the twisted section at the plane in a single turn, wherein the first ridge has a cut portion such that the winding core has two projecting portions formed at the first ridge, the projecting portions having a side that forms a point with a portion of the peripheral surface of the winding core parallel to the plane when viewed along the central axis, and the winding core has a pentagonal, hexagonal, or semispherical cross section when viewed along the central axis, wherein when the winding core has a pentagonal or hexagonal cross section, the winding core includes a second ridge, a third ridge and a fourth ridge arranged at portions along the circumference of the winding core different from where the first ridge is located, the second ridge, third ridge and fourth ridge extending in the same direction as the first ridge, and each of the second ridge, the third ridge and the fourth ridge has a cut portion such that the winding core has six projecting portions formed at the second ridge, the third ridge and the fourth ridge, the projecting portions having a side that forms a point with a portion of the peripheral surface of the winding core.

2. The coil component according to claim 1, wherein both the first wire and the second wire are in close contact with the first ridge in the twisted section at the plane in neighboring turns.

3. The coil component according to claim 2, wherein a number of close contacts of the first wire with the first ridge and a number of close contacts of the second wire with the first ridge are approximately equal.

4. The coil component according to claim 3, wherein both the first wire and the second wire in the twisted section at the plane are in close contact with both the first ridge and the second ridge in the single turn.

5. The coil component according to claim 3, wherein the peripheral surface of the winding core includes at least four planes arranged adjacently in the peripheral direction.

6. The coil component according to claim 3, wherein both the first wire and the second wire in the twisted section are in close contact with the ridges in a portion other than a winding beginning portion and a winding ending portion of the first and second wires around the winding core.

7. The coil component according to claim 2, wherein both the first wire and the second wire in the twisted section at the plane are in close contact with both the first ridge and the second ridge in the single turn.

8. The coil component according to claim 2, wherein the peripheral surface of the winding core includes at least four planes arranged adjacently in the peripheral direction.

9. The coil component according to claim 2, wherein both the first wire and the second wire in the twisted section are in close contact with the ridges in a portion other than a winding beginning portion and a winding ending portion of the first and second wires around the winding core.

10. The coil component according to claim 1, wherein both the first wire and the second wire in the twisted section at the plane are in close contact with both the first ridge and the second ridge in the single turn.

11. The coil component according to claim 10, wherein both the first wire and the second wire in the twisted section at the plane are in close contact with both the first ridge and the second ridge in the neighboring turns.

12. The coil component according to claim 11, wherein a number of times the first wire passes through the first ridge in close contact therewith and a number of times the first wire passes through the second ridge in close contact therewith are approximately equal, and a number of times the second wire passes through the first ridge in close contact therewith and a number of times the second wire passes through the second ridge in close contact therewith are approximately equal.

13. The coil component according to claim 11, wherein a number of times the first wire passes through the first ridge in close contact therewith and a number of times the second wire passes through the first ridge in close contact therewith are approximately equal, and a number of times the first wire passes through the second ridge in close contact therewith and a number of times the second wire passes through the second ridge in close contact therewith are approximately equal.

14. The coil component according to claim 13, wherein a number of times the first wire passes through the first ridge in close contact therewith and a number of times the first wire passes through the second ridge in close contact therewith are approximately equal, and a number of times the second wire passes through the first ridge in close contact therewith and a number of times the second wire passes through the second ridge in close contact therewith are approximately equal.

15. The coil component according to claim 10, wherein a number of times the first wire passes through the first ridge in close contact therewith and a number of times the first wire passes through the second ridge in close contact therewith are approximately equal, and a number of times the second wire passes through the first ridge in close contact therewith and a number of times the second wire passes through the second ridge in close contact therewith are approximately equal.

16. The coil component according to claim 1, wherein the peripheral surface of the winding core includes at least four planes arranged adjacently in the peripheral direction.

17. The coil component according to claim 16, wherein a dimension of each of the planes measured in the peripheral direction of the winding core is an integral multiple of the shortest dimension of the dimensions of the planes.

18. The coil component according to claim 16, wherein the peripheral surface of the winding core includes six planes arranged adjacently in the peripheral direction.

19. The coil component according to claim 18, wherein a dimension of each of the planes measured in the peripheral direction of the winding core is an integral multiple of the shortest dimension of the dimensions of the planes.

20. The coil component according to claim 1, wherein both the first wire and the second wire in the twisted section are in close contact with the ridges in a portion other than a winding beginning portion and a winding ending portion of the first and second wires around the winding core.

* * * * *